(12) United States Patent
Miller

(10) Patent No.: US 8,347,645 B1
(45) Date of Patent: Jan. 8, 2013

(54) HYDROGEN FUEL CELL DRIVEN HVAC AND POWER SYSTEM FOR ENGINE-OFF OPERATION INCLUDING PEM REGENERATIVE HYDROGEN PRODUCTION

(75) Inventor: Edward N. Miller, Glen Allen, VA (US)

(73) Assignee: Marz Industries, Inc., Richmond, VA (US)

(*) Notice: Subject to any disclaimer, the term of this patent is extended or adjusted under 35 U.S.C. 154(b) by 380 days.

(21) Appl. No.: 12/658,286

(22) Filed: Feb. 5, 2010

(51) Int. Cl.
*F25B 27/00* (2006.01)
(52) U.S. Cl. .......................................... 62/236; 62/238.7
(58) Field of Classification Search .................. 62/236, 62/238.7, 324.1, 160; 165/163, DIG. 108, 165/DIG. 206; 429/400, 407, 413; 60/286
See application file for complete search history.

(56) References Cited

U.S. PATENT DOCUMENTS

| | | | |
|---|---|---|---|
| 5,964,089 A * | 10/1999 | Murphy et al. | 60/286 |
| 6,149,810 A * | 11/2000 | Gonzalez-Martin et al. | 210/321.84 |
| 6,308,465 B1 * | 10/2001 | Galloway et al. | 52/79.1 |
| 6,899,968 B2 * | 5/2005 | Hasuka et al. | 429/431 |
| 7,096,925 B2 | 8/2006 | Bracciano | |
| 7,191,737 B2 | 3/2007 | Klein | |
| 7,316,119 B2 | 1/2008 | Allen | |
| 7,427,450 B2 | 9/2008 | Raiser | |
| 7,454,922 B2 | 11/2008 | Zeigler et al. | |
| 2001/0046616 A1 * | 11/2001 | Mossman | 429/13 |
| 2002/0038732 A1 * | 4/2002 | Sugiura et al. | 180/65.2 |
| 2002/0182461 A1 * | 12/2002 | Hasuka et al. | 429/23 |
| 2004/0110047 A1 * | 6/2004 | Hwang et al. | 429/22 |
| 2005/0128689 A1 * | 6/2005 | Caci et al. | 361/679 |
| 2006/0159970 A1 * | 7/2006 | Kato et al. | 429/25 |
| 2006/0207274 A1 | 9/2006 | Harris | |
| 2009/0075135 A1 * | 3/2009 | Nonobe | 429/20 |
| 2010/0275858 A1 | 11/2010 | Jeffs et al. | |

* cited by examiner

*Primary Examiner* — Mohammad Ali
(74) *Attorney, Agent, or Firm* — LeonardPatel PC

(57) ABSTRACT

A hydrogen fuel cell driven HVAC and power system for powering a vehicle during engine-off time. The system includes a power storage and fuel cell conversion unit integrated with a high efficiency reverse cycle heat pump to provide cab comfort and auxiliary power to a vehicle when the engine is off. Hydrogen gas is generated from vehicle wasted energy during coasting, braking and at times of engine peak performance and is safely stored in metal hydride storage containers at low pressure. During engine-off time, a fuel cell draws from the stored hydrogen and works in conjunction with the heat pump to heat and cool and provide electrical power to the vehicle. The system is a green energy solution to anti-idling regulations as it produces no harmful EPA emissions as it provides air conditioning and power to the vehicle during engine-off time.

20 Claims, 6 Drawing Sheets

HYDROGEN FUEL CELL DRIVEN HVAC AND POWER SYSTEM FOR ENGINE-OFF OPERATION INCLUDING PEM REGENERATIVE HYDROGEN PRODUCTION

FIELD OF THE INVENTION

This invention relates to a single integrated unit hydrogen fueled forced air cooling, heating, and power unit based on PEM fuel cell technology with on board hydrogen regeneration. The hydrogen fueled system provides conditioned air and auxiliary power to the cab interior of line haul sleeper cab trucks, railroad locomotives, and port equipment during engine off occupation.

BACKGROUND OF THE INVENTION

Although diesel engines play an important role in the transport of goods and services nationwide, there is a growing concern about the health effects associated with exposure to diesel exhaust. Everyone is affected by diesel exhaust, especially those persons with heart or lung disease, asthma, or other respiratory problems aggravated by the minute particles in diesel exhaust. Unfortunately, there is a practice in some industries to keep diesel engines idling when they are not actively hauling loads. Such idling of diesel engines not only leads to the health effects discussed above but also causes pollution and excessive engine wear, poses health risks to drivers, and wastes fuel and money. An idling diesel engine can emit significant amounts of pollution including carbon dioxide, nitrogen oxides, and volatile organic compounds, which contribute to the formation of ozone smog, poisonous carbon monoxide, and particulate matter.

In order to reduce the negative health and pollution effects of diesel engine idling, many states have passed anti-idling regulations. Vehicle idling restriction ordinances limit the amount of time that a diesel engine can be operated consecutively, and typically this time limit is three to five minutes. Thus, many states have legislated laws to ensure that diesel engines will be turned off when the vehicle is not in motion. The Environmental Protection Agency (EPA), being charged with overseeing compliance with the nation's environmental laws, strictly enforces these anti-idling laws and frequently assesses penalties on companies who do not meet their obligations. EPA required reduction in pollution; fuel consumption, cost, and improvement in health are therefore major concerns in the freight handling industry. Other agencies such as OSHA, EPA, DOE and CARB are also focused on the freight industry in regards to health, safety, air pollution and fuel consumption.

To date, general practices in the freight industry are aligning themselves with agency goals but further compliance is required to completely fulfill the agencies' mandated goals. For instance OSHA requires truck drivers to rest for periods of time after driving a period of time. The efficient operator will stop exactly where he or she is at the end of their allotted drive time, climb into their bunk and sleep with the truck idling to provide comfort while resting. The EPA legislation prevents this idling and DOE places pressure on operators to improve fuel mileage as well as reducing fuel consumption by more efficient use of resources.

Although various devices have become available to help the owner and operator comply with the anti-idling laws, most of them skirt the real intent of the legislation without truly eliminating the use of fossil fuels and thus continue to pollute the environment. A need therefore exists for a device that will completely comply with existing as well as future anti-idling regulations, including a heating, ventilation, air conditioning (HVAC) and power system that has no harmful emissions and eliminates the use of fossil fuels. The system should be able to quickly and efficiently reduce fleet emissions, increase fuel mileage, and reduce fuel consumption thus bringing trucking companies into full compliance with agency requirements. The system should be designed to retro-fit older model vehicles, along with current and future model vehicles. What is needed is a simple, efficient, retro-fit compatible, stand-alone system that can be installed quickly and be capable of rapid replacement of components if necessary.

SUMMARY OF THE INVENTION

The HVAC and power system includes a power storage and fuel cell conversion unit integrated with a high efficiency reverse cycle heat pump. Hydrogen is generated from vehicle wasted energy during coasting, braking and at times of engine peak performance. Hydrogen gas is then safely stored in metal hydride storage containers at low pressure. During engine-off-time, an operator can activate the system to provide cab temperature conditioning, DC power, and AC auxiliary power without draining the vehicle main batteries. The modular unit is attached to a base plate mounted on the exterior wall of the cab allowing for quick installation and replacement. By eliminating diesel as a fuel source, the fuel cell based system of the current invention will increase overall fuel mileage over conventional diesel powered APU systems. The HVAC and power system eliminates all harmful EPA emissions during regular engine off intervals and reduces engine maintenance.

OBJECTS AND ADVANTAGES

Several advantages are achieved with the hydrogen fuel cell driven HVAC and power system of the present invention, including:

(1) The system provides a green energy solution to restrictions on running diesel engines while the vehicles are parked.
(2) The system enables operators to comply with diesel engine anti-idling regulations that have been enacted by states and are enforced by the EPA.
(3) The HVAC and power system is a total green energy solution in that it provides a source of energy that is environmentally friendly, non-polluting, and does not burn fossil fuels.
(4) Adoption of the system during will completely eliminate exhaust from the internal combustion engine of the vehicle for purposes of operator comfort during rest periods as all the power and heating and cooling to the vehicle compartments is provided by a fuel-cell based system that is non-polluting.
(5) The system provides all electrical power needs for a vehicle interior while the main traction engine is off, including 110 volt AC power and 12 volt DC power.
(6) Hydrogen storage is in metal hydride storage tanks, which are inherently safer than storage of compressed hydrogen gas and substantially cheaper than storage of liquefied hydrogen at cryogenic temperatures.

These and other objects and advantages of the present invention will be better understood by reading the following description along with reference to the drawings.

INDEX TO REFERENCE NUMERALS IN DRAWINGS

| 20 | hydrogen fuel cell driven HVAC and power system |
|---|---|
| 22 | fuel cell system |
| 24 | electrolyzer system |
| 26 | hydrogen storage system |
| 28 | reverse cycle heat pump system |
| 30 | fuel cell |
| 32 | hydrogen pressure control valve |
| 34 | variable speed air blower |
| 36 | air filter |
| 38 | exhaust water |
| 40 | air membrane humidifier |
| 42 | hydrogen recirculation loop |
| 44 | hydrogen recirculation pump |
| 46 | solenoid operated purge valve |
| 50 | cooling loop |
| 52 | coolant circulating pump |
| 54 | multi-coil heat exchanger |
| 56 | hydrogen storage rack heat exchanger |
| 58 | cooling loop thermostatic control valve |
| 60 | hydrogen storage cooling valve |
| 62 | fuel cell controller |
| 64 | hydrogen storage system |
| 66 | hydrogen shutoff solenoid valve |
| 67 | storage battery |
| 68 | DC/DC power converter |
| 70 | DC/AC inverter |
| 72 | AC outlet |
| 74 | shore power connector |
| 76 | transmission mounted DC generator |
| 78 | electrolyzer controller |
| 80 | PEM electrolyzer |
| 82 | distilled water storage tank |
| 84 | PEM cell |
| 86 | hydrogen discharge from PEM electrolyzer |
| 88 | multistage hydrogen dryer |
| 90 | PEM pressure control and fill valve |
| 91 | oxygen exhaust from electrolyzer |
| 92 | distilled water preset relief valve |
| 93 | exhaust water from fuel cell |
| 94 | electrolyzer cooling loop |
| 96 | electrolyzer cooling pump |
| 98 | metal hydride storage tank |
| 100 | hydrogen system external port |
| 106 | dryer drain valve |
| 108 | check valve |
| 109 | service disconnect |
| 110 | heat pump controller |
| 112 | operator control panel |
| 114 | refrigerant system |
| 116 | reversing valve |
| 117 | refrigerant flow during cooling |
| 118 | condenser fan |
| 119 | refrigerant flow during heating |
| 120 | conditioning air supply fan |
| 121 | cab heat exchanger |
| 122 | compressor |
| 124 | fresh air intake valve |

-continued

| 126 | relief damper |
|---|---|
| 128 | three-way valve |
| 130 | refrigerant charge port |
| 132 | air filter |
| 134 | high pressure switch |
| 136 | refrigerant sub-accumulator |
| 138 | expansion valve |
| 140 | strainer |
| 142 | chassis |
| 144 | base plate |
| 146 | cab |
| 148 | supply air vent |
| 150 | return air vent |

DETAILED DESCRIPTION OF THE INVENTION

Figure 1:
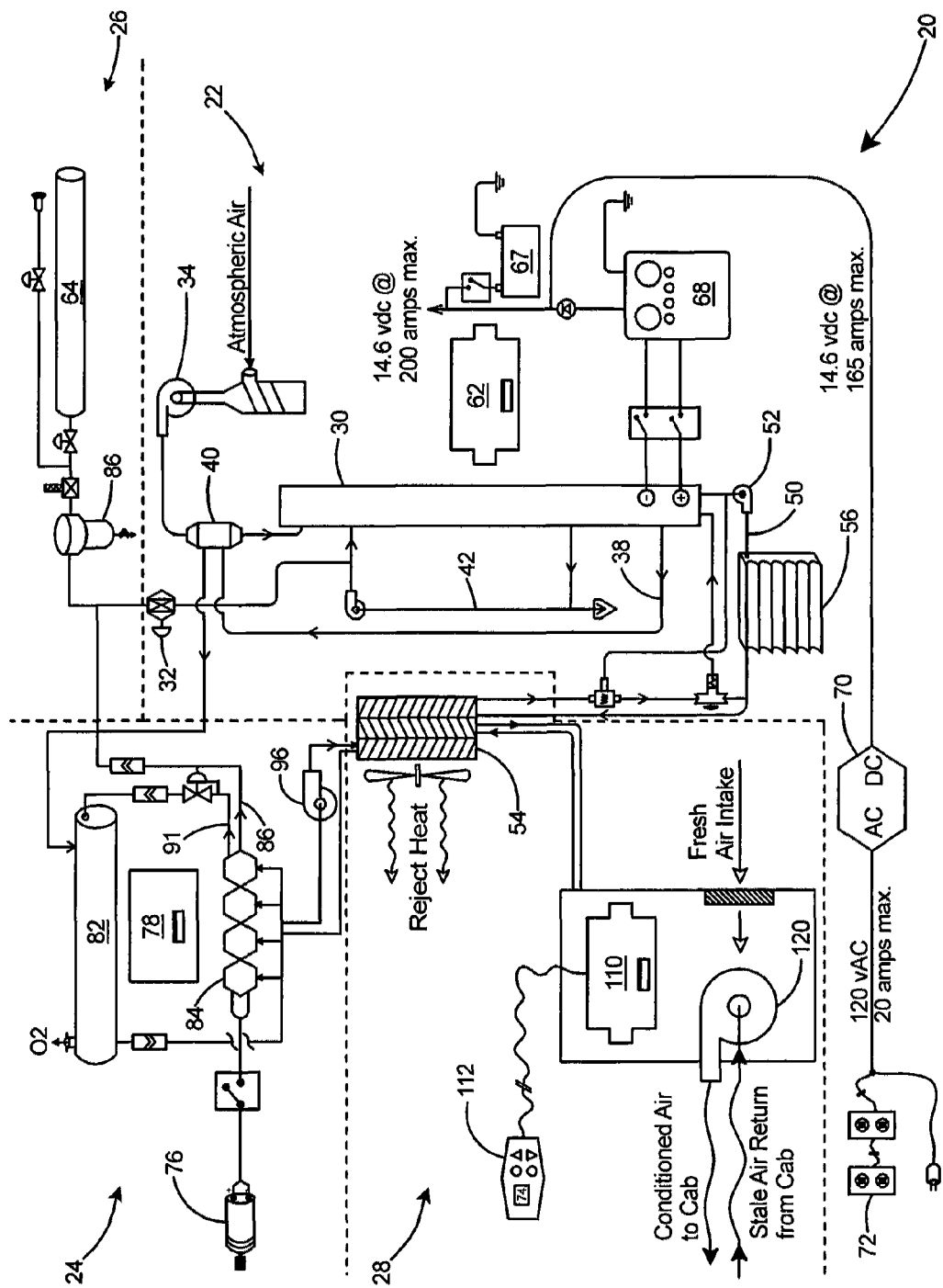
FIG. 1 is a schematic diagram of a preferred embodiment of a hydrogen fuel cell driven HVAC and power system with PEM regenerative hydrogen production according to the present invention.

With reference to a preferred embodiment depicted in FIG. 1, the invention is a hydrogen fuel cell driven HVAC and power system 20 including hydrogen regeneration for supplying conditioned air and electrical power to one or more compartments in a diesel-powered vehicle during times when the engine is off. The hydrogen fuel cell driven HVAC and power system 20 has four subsystems as delineated by the dashed lines in FIG. 1, including a fuel cell system 22 for generating electrical power, an electrolyzer system 24 for regenerating hydrogen fuel, a hydrogen storage system 26 for storing hydrogen at low pressure, and a high efficiency reverse cycle heat pump system 28 for efficiently capturing heat generated by the fuel cell system 22 and electrolyzer system 24 and supplying conditioned air to the cab or compartments in the vehicle.

Figure 2:
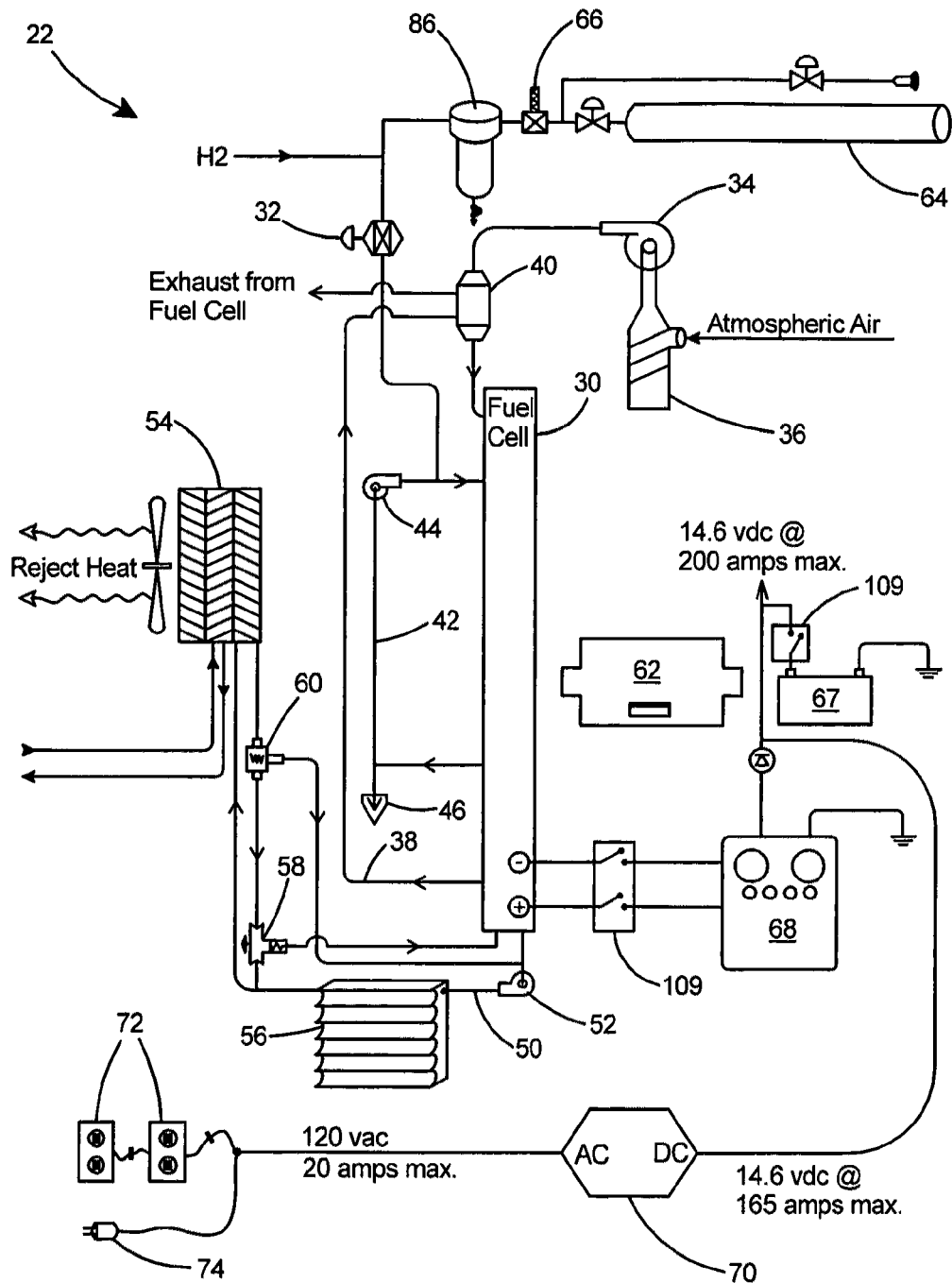
FIG. 2 is a schematic diagram of a fuel cell apparatus that forms a portion of the HVAC and power system of FIG. 1.

Referring to FIG. 2, the fuel cell system 22 includes a proton exchange membrane (PEM) fuel cell 30 that combines hydrogen with oxygen from air to generate at least 4.5 kW of power at 15.5 vdc and 300 amps. Hydrogen fuel supply to the fuel cell 30 is controlled by a hydrogen pressure control valve 32 and oxidant, from atmospheric air, is supplied by a pulse width modulated (PWM) variable speed blower 34 that is preferably capable of supplying air at 0-14.5 psi and 0-200 liters/minute. The hydrogen pressure control valve 32 preferably accepts a 4-20 ma control input and is rated at 0-17 psi output pressure. The air is filtered by a three stage air filter 36 to insure that filtered clean air is supplied to the fuel cell 30. The fuel cell 30 produces electricity from the hydrogen fuel on the anode side and the oxidant on the cathode side. Exhaust water 38, including oxygen, depleted air, and water vapor, flows out of the fuel cell and is routed for capture and reuse. The exhaust water 38 is routed through a supply air membrane humidifier 40 to humidify the incoming air to the fuel cell 30. A hydrogen recirculation loop 42 includes a hydrogen recirculation pump 44 and a solenoid operated purge valve 46 for purging stale gas and excess moisture from the hydrogen recirculation loop 42. The hydrogen recirculation pump 44 is preferably a variable speed PWM pump designed for a flow rate of 0-50 liters/minute at 0-17.5 psi.

The fuel cell system 22 further includes a cooling loop 50 for controlling the temperature of the fuel cell 30. The cooling loop 50 includes a PWM variable speed coolant circulating pump 52 for circulating 0-2 liters/minute of cooling water between the fuel cell 30 and a multi-coil heat exchanger 54. The cooling water in the cooling loop 50 is routed through a hydrogen storage rack heat exchanger 56 to provide heating of the hydrogen storage tanks (not shown). A cooling loop thermostatic control valve 58 is provided in the cooling loop 50 to enable bypassing of the heat exchanger 54 until the operating temperature of the fuel cell 30 reaches 141° F. The cooling loop thermostatic control valve 58 is self contained, self actuated, and consumes no electricity or power. The cooling loop 50 further includes a hydrogen storage cooling valve 60. The hydrogen storage cooling valve 60 is a three-way solenoid valve that can be energized to bypass the thermostatic control valve 58 and the fuel cell 30 and thereby enable coolant to circulate through the hydrogen storage rack heat exchanger 56 to cool the hydrogen storage as the system is producing hydrogen.

Control of the fuel cell system 22 is provided by a fuel cell controller 62 that is preferably a dedicated programmable controller with network communication to other system controllers, wireless devices, a GPS, and an external programming terminal (not shown). Hydrogen is supplied to the fuel cell system 22 from hydrogen storage 64 through a hydrogen shutoff solenoid valve 66 that is set closed or open as the system demands. When powered on, the fuel cell controller 62 maintains the fuel cell 30 at a ready level and monitors demand for electricity from the operator control panel, heat pump system 28 (see FIG. 4) and vehicle readiness system (not shown). A high density storage battery 67 provides reserve DC electricity for start up and to maintain fuel cell 30 operational readiness. A demand for start up from any of the system is accompanied by a power demand requirement. Using an imbedded power table, the fuel cell controller 62 starts the fuel cell 30 to the proper level or adds to the current running level.

In operation, the fuel cell controller 62 first starts the cooling circulating pump 52 at low speed, then opens the hydrogen shutoff valve 66, sets the hydrogen pressure control valve 32, and starts the hydrogen recirculation pump 44 per the table reference pressures and speeds. The fuel cell controller 62 then energizes the variable speed air blower 34 to the speed required by the reference table. Immediately upon introduction of hydrogen and air the fuel cell 30 produces electricity for use and distribution by a DC/DC power converter 68. The DC/DC power converter 68 converts the electrical output of the fuel cell 30, which is in a range of 25 to 15.5 vdc at 0 to 300 amps, to a constant 14.6 vdc at 200 amps maximum to power internal devices of the HVAC and power system 20. A DC/AC inverter 70 is powered on or off as needed to supply 120 vac at 20 amps maximum to one or more AC outlets 72 within the compartments of the vehicle. A shore power connection 74 is provided for accessing external 120 vac power to provide the capability to run the HVAC and power system 20 from an external source if desired.

Figure 3:
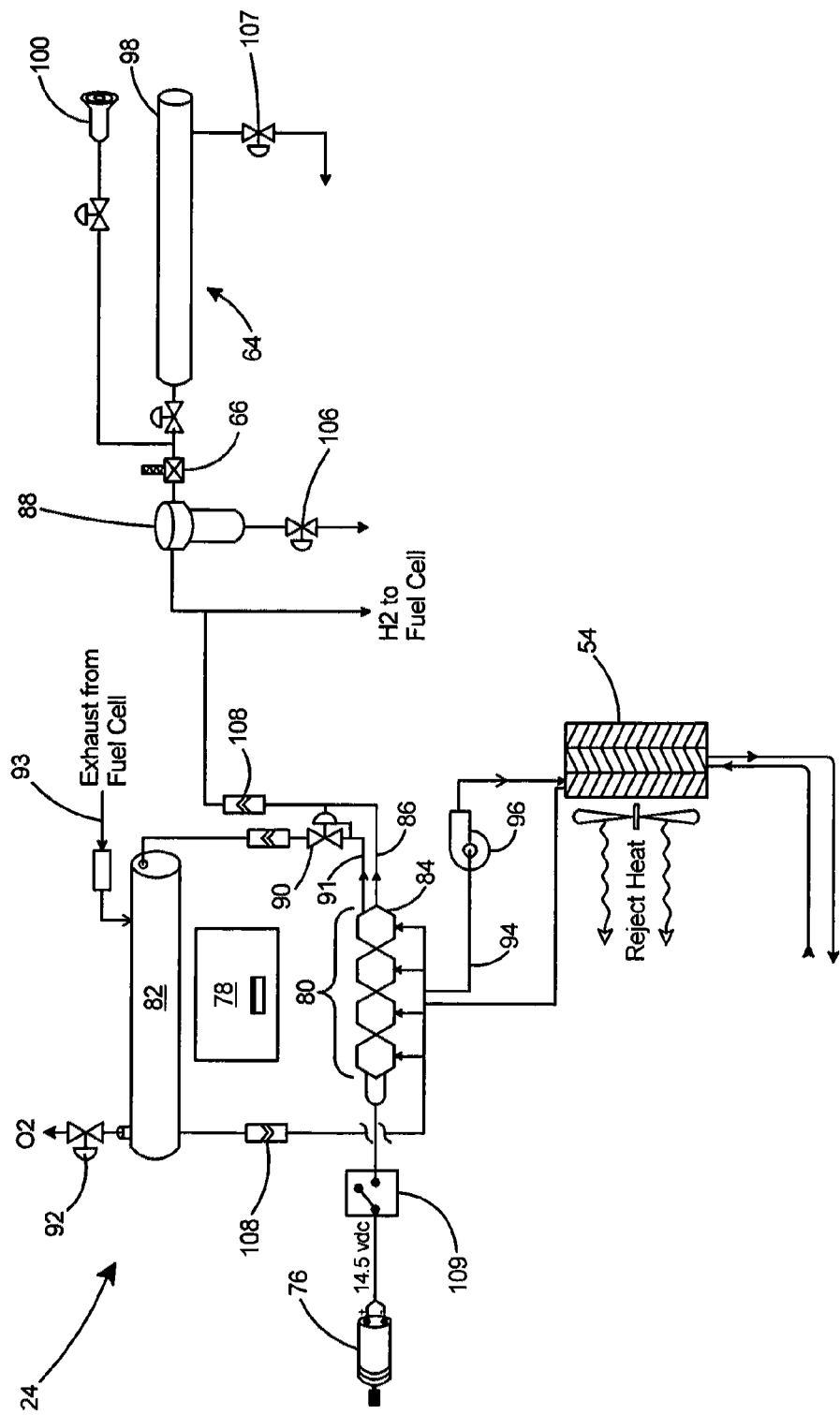
FIG. 3 is a schematic diagram of an electrolyzer apparatus that forms a portion of the HVAC and power system of FIG. 1.

A significant feature of the HVAC and power system 20 of the present invention is the ability to generate hydrogen for storage while the vehicle's engine is on or while the vehicle is moving. With reference to FIG. 3, DC electricity for hydrogen generation is primarily but not limited to a transmission mounted DC generator 76, which is mounted to the vehicle's engine (not shown) in the same manner as conventional power take-off (PTO) equipment. Electricity for hydrogen generation could also be obtained from a solar panel, wind turbine, or external power (not shown). A dedicated intelligent networked electrolyzer controller 78 varies the load placed on the vehicle by the DC generator 76 for the generation of hydrogen based on storage need compared with vehicle operation for maximum use of wasted kinetic energy and minimum use of engine energy for optimum storage. DC electricity from the DC generator 76 is routed to a proton exchange membrane (PEM) electrolyzer 80 that converts distilled water from a distilled water storage tank 82 into hydrogen and oxygen in a bank of separate PEM cells 84, four of which are depicted in the preferred embodiment depicted in FIG. 3. The hydrogen flow 86 is then conveyed to a multistage hydrogen dryer 88 where it is dried and then flows to hydrogen storage 64 where the hydrogen is stored in metal hydride storage tanks 98 at 250 psi using the natural ion pumping capacity of the PEM cells 84. The flow of distilled water into the electrolyzer 80 is controlled by a PEM pressure control and fill valve 90 on the oxygen outflow stream 91 from the PEM cells 84.

The electrolyzer controller 78 is a dedicated programmable controller with network communication to other system controllers, wireless devices, a GPS, and an external programming terminal (not shown). In operation, the electrolyzer controller 78 monitors the voltage from the transmission mounted DC generator 76. In response to a signal that the vehicle's engine is running, the electrolyzer controller 78 will begin producing and storing hydrogen. The electrolyzer controller 78 is programmed to control the rate of hydrogen production based on inputs from truck operation so as not to put extra load on the truck during acceleration or uphill climbs. The minimum load of the electrolyzer system 24 for generation of hydrogen will be 12% of the full load of 4 Kw. The load placed on the truck will be varied based on speed versus throttle position and brake input. Full load will be when the brake is on. Loading is controlled by enabling or disabling the PEM cells 84 in conjunction with varying the output of the DC generator 76.

The distilled water storage tank 82 is a plastic tank that is sized appropriately to include enough distilled water to supply the PEM cells 84 and to provide an accumulation reservoir for the waste water return from the fuel cell. The distilled water tank 82 operates at atmospheric pressure when filling and operates at 15 psi during production of hydrogen. Pressure is supplied from oxygen relief from the PEM cells 84 and the pressure will be controlled in the tank by a preset relief valve 92. The preset relief valve 92 controls pressure by exhausting oxygen ($O_2$) from the distilled water tank 82 to the atmosphere. Exhaust water 93, including oxygen, depleted air, and water vapor, flows out of the fuel cell (see FIG. 2) and is routed to distilled water storage tank 82 condenser for capture and reuse of water.

An electrolyzer cooling loop 94 provided on the electrolyzer system 24 is constructed of non-corrosive piping and includes a PWM DC voltage electrolyzer cooling pump 96 that pumps distilled water through the multi-coil heat exchanger 54. At low PEM cell temperatures, the electrolyzer cooling loop 94 circulates distilled water through the anode side of the PEM cells 84 at a low flow rate. As PEM cell temperature increases above 100° F., flow rate will be increased by a signal from the electrolyzer controller 78 to the electrolyzer cooling pump 96 to maintain a temperature of 130° F. in the PEM cells 84. Preferably, each of the PEM cells 84 is a 6-cell polymer electrolytic membrane (PEM) electrolysis unit rated for 14.5 vdc at 75 amps and will produce 6.3 liters/minute of hydrogen gas ($H_2$). In the preferred embodiment, four PEM cells 84 are used in the electrolyzer system 24 and each is controlled by the electrolyzer controller 78. Full production rate of the 4-cell electrolyzer 80 is 25 liters of hydrogen gas per minute.

Referring to FIG. 3, hydrogen is stored in a metal hydride storage system 64 at 250 psi, using D.O.T. one or more approved metal hydride storage tanks 98 to house the hydrogen. Each of the metal hydride storage tanks 98 are equipped with pressure/temperature safety valves. The tanks 98 are considered full when pressure equalizes at 250 psi, and tank temperature settles to 74° F. or less. The metal hydride storage tanks 98 are mounted to a heat exchanging rack 56 (see FIG. 2) that cools them while being filled with hydrogen and to heat them during hydrogen usage by the fuel cell system. The hydrogen storage system 64 is equipped with an external port 100. The external port 100 is used for reconditioning of tanks when necessary as well as external refueling of the tanks 98 with hydrogen.

There are two discharges from the PEM electrolyzer 80 including an oxygen exhaust line 91 and a hydrogen discharge line 86. A differential pressure controller modulates the PEM pressure control and fill valve 90 on the oxygen exhaust line 91. As hydrogen pressure increases in the hydrogen discharge line 86, the PEM pressure control and fill valve 90 will be modulated closed to maintain an oxygen pressure equivalent to the hydrogen pressure minus 5 psi (+/−2 psi). Valve 90 is modulated fully open to relieve oxygen and hydrogen pressure momentarily and thus allow water to refill the (PEM) cells 84 as called for by the electrolyzer controller 78. Oxygen is exhausted to the distilled water storage tank 82.

The multistage dryer 88 includes a float-operated automatic drain valve 106 and removes moisture from the hydrogen gas stream to 10 ppm $H_2O$ or less before it enters the hydrogen storage tanks 64. The dryer drain valve 106 is provided to remove liquid water and return it to the distilled water storage tank 82. Several check valves 108 are provided to prevent reverse flow of product streams exiting the electrolyzer 80. A service disconnect 109 is provided on the electrical connection between the transmission mounted generator 76 from the PEM cells 84.

Figure 4:
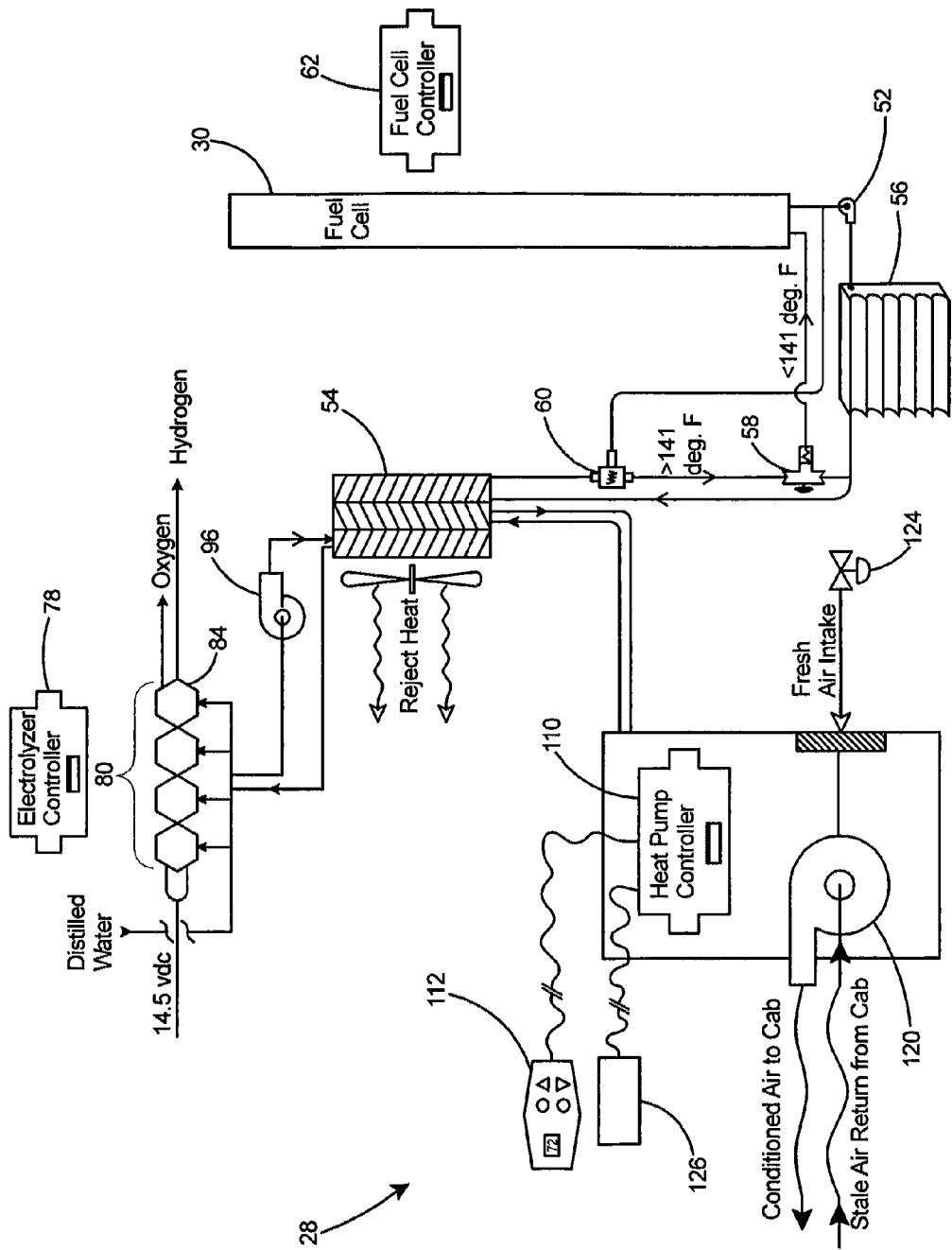
FIG. 4 is a schematic diagram of a heat pump apparatus that forms a portion of the HVAC and power system of FIG. 1.

With reference to FIG. 4, the hydrogen fuel cell driven HVAC and power system of the present invention includes a heat pump controller 110 for controlling the reverse cycle heat pump system 28 that provides conditioned air to the interior compartments of the vehicle, such as the sleeper cab. An operator control panel 112 is typically mounted in the vehicle cab to provide operator input to the heat pump controller 110. The heat pump controller 110 is preferably a dedicated, programmable controller with network communication to other system controls, wireless devices, a GPS, and to an extended programming terminal.

Figure 5:
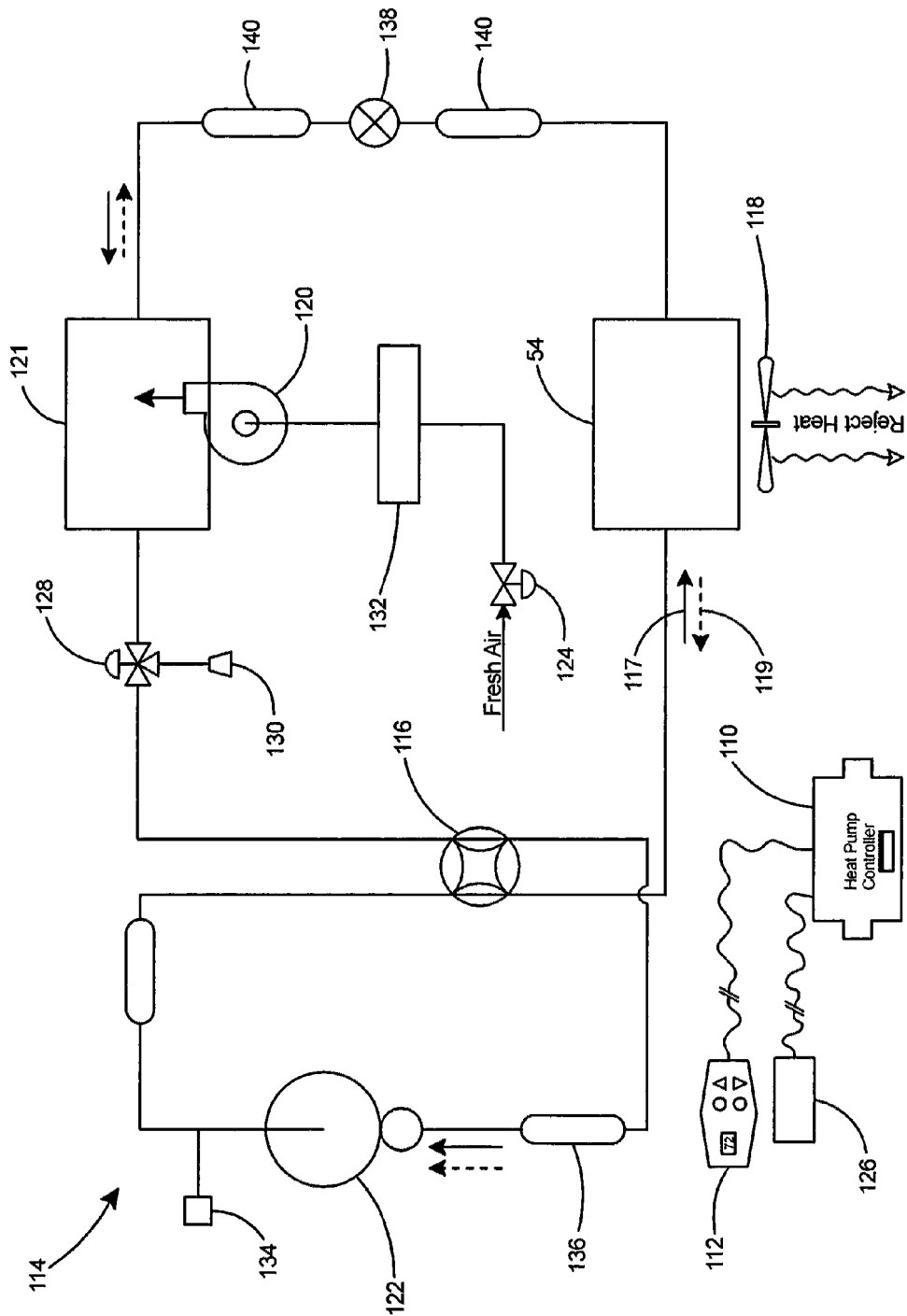
FIG. 5 is a schematic of the refrigeration system of the heat pump portion of a hydrogen fuel cell driven HVAC and power system according to the present invention.

As shown in a schematic of the refrigerant system 114 in FIG. 5, when activated from the operator control panel 112 in the cab via serial communication, the controller 110 cycles a reversing valve 116 then sets the valve position per heating or cooling request. The condenser fan 118 will reverse direction depending on whether it is in a heating or cooling mode. The directional arrows 117 and 119 depict the direction of flow of refrigerant with the solid line arrow depicting refrigerant flow during cooling mode 117 and the dashed line arrow depicting refrigerant flow during heating mode 119. Concurrently a power request is sent to the fuel cell controller 62, giving the fuel cell 30 (see FIG. 4) time to respond to the upcoming demand for power. The heat pump controller 110 starts the supply fan 120 of the cab interior heat exchanger 121 at slow speed, the compressor 122 at slow speed and the condenser fan 118 at slow speed. The heat pump controller 110 verifies motor speed by amp draw and verifies it with the amp draw increase at the fuel cell 30. When in auto mode, the heat pump controller 110 ramps up the compressor 122 and fan 118 speeds to the target speed over a period of time as long as two minutes to reach full speed. The heat pump controller 110 determines target speed based on differential between the actual temperature and the set point or target temperature at the operator control panel 112. A 10° F. differential between set point and target temperature results in a target speed of 100%.

Concurrent with startup speed verification, the controller 110 opens the fresh air intake valve 124 to a setting of 10%. After start up the heat pump controller 110 uses the cab and outside temperature and humidity sensors to calculate and compare enthalpy inside and outside of the cab to determine the position of the fresh air intake valve 124. When the supply fan 120 is running and the fresh air intake valve 124 is open a spring loaded relief damper 126 maintains a positive pressure on the cab interior as long as all doors and windows are closed. When the system is in automatic mode, the controller uses proportional plus integral (P+I) control to maintain the temperature set point. As the cab interior temperature approaches set point the speeds of the compressor 122 and condenser fan 118 slow to a minimum speed determined by the P+I control loop. An overshoot of the set point will stop the compressor 122 and condenser fan 118. A three-way valve 128 and a charge port 130 are provided in the refrigerant system 114 to enable charging the loop with refrigerant when required. An air filter 132 is provided on the air intake line to filter the incoming air. Other components in the refrigeration system 114 include a high pressure switch 134, a refrigerant sub-accumulator 136, an expansion valve 138, and multiple strainers 140.

Figure 6:
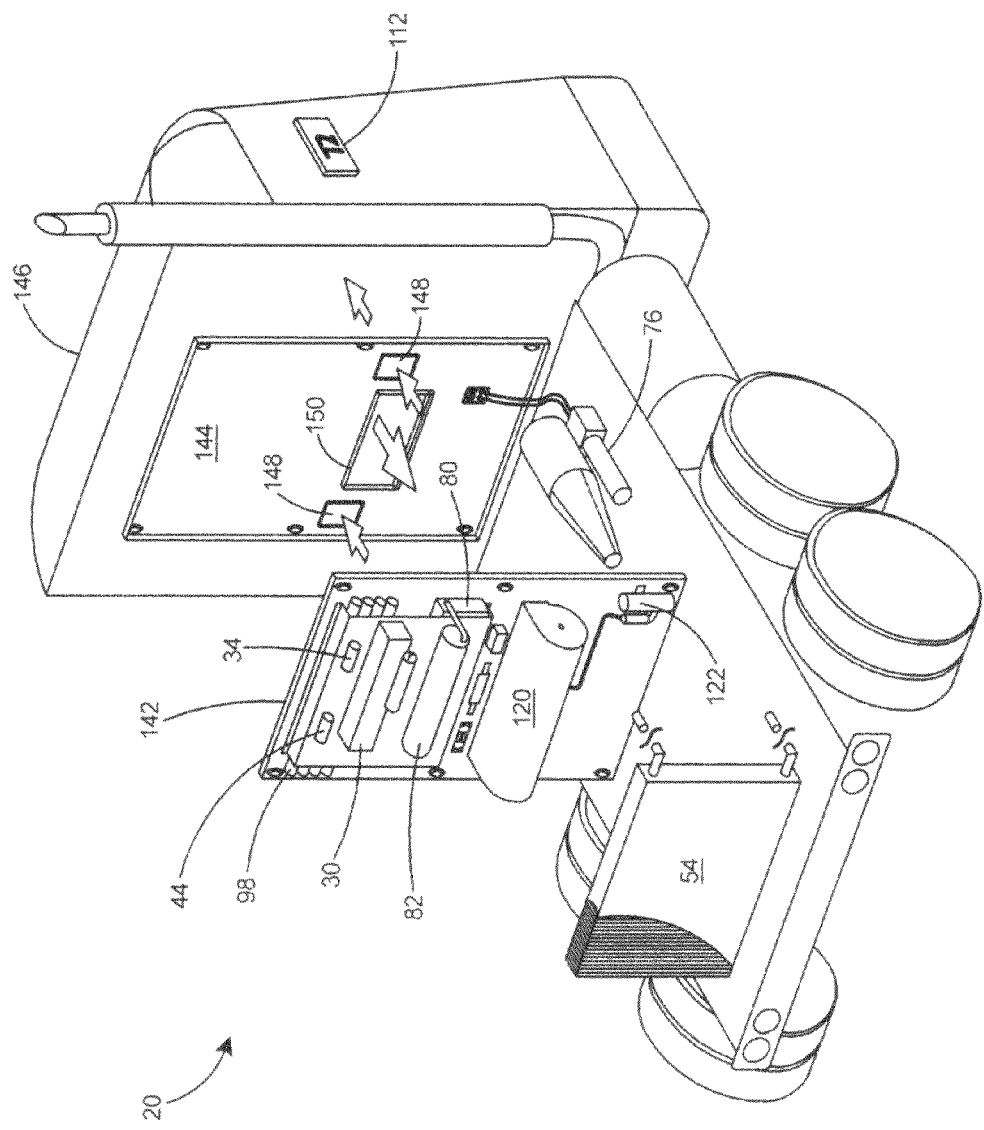
FIG. 6 is a perspective view of a practical implementation of the hydrogen fuel cell driven HVAC and power system of the present invention installed on a truck.

With reference to FIG. 6 there is shown a practical implementation of a hydrogen fuel cell driven HVAC and power system 20 according to the present invention installed on a diesel truck. The system is modular to enable easy replacement of components and to enable rapid retro fit of fleet vehicles with minimal downtime. The modular unit 20 is mounted on a chassis 142 that will be secured to a base plate 144. The base plate 144 is mounted on the exterior wall of the cab 146 allowing for quick installation and subsequent replacement if required. The fuel cell based system 20 will increase overall fuel mileage over conventional diesel powered auxiliary power unit (APU) systems and engine idling for power. The hydrogen fuel cell driven HVAC and power system 20 completely eliminates diesel as a fuel source to condition the air and provide power to the cab 146 during engine down time or to power any APU (not shown) installed on the truck. The system will also eliminate all harmful EPA emissions during regular engine off intervals and reduce engine maintenance by reducing wear and tear on the engine. Components shown mounted on the chassis 142 include the fuel cell 30, variable speed air blower 34, hydrogen recirculation pump 44, multi-coil heat exchanger 54, metal hydride hydrogen storage tanks 98, PEM electrolyzer 80, distilled water storage tank 82, conditioning air supply fan 120, and the heat exchanger compressor 122. Other components of the HVAC and power system 20 shown in FIG. 6 include the transmission mounted DC generator 76, supply air vents 148 to the cab 146, and a return air vent 150 from the cab. Preferably, the fuel cell 30 is a proton exchange membrane (PEM) fuel cell stack, which is available from Ballard Power Systems, Inc., Burnaby, British Columbia, Canada. The preferred (PEM) fuel cell 30 is a liquid-cooled, hydrogen fueled proton exchange membrane fuel cell stack capable of producing at least 4.5 kW of power at 15.5 vdc and 300 amps.

A hydrogen fuel cell driven HVAC and power system 20 such as depicted in FIG. 6 will provide cab comfort and auxiliary power to the cab 146, and sleeper if desired, of a vehicle during engine-off time and will regenerate hydrogen while the vehicle is moving. Hydrogen is generated from vehicle wasted energy during coasting, braking and at times of engine peak performance. The generated hydrogen gas is safely stored in metal hydride storage containers 98 at low pressure. During engine-off-time the operator can activate the system to provide cab temperature conditioning, DC power, and AC auxiliary power without draining the vehicle's main batteries. The preferred hydrogen storage containers are OVONIC™ solid hydrogen storage canisters, which are available from Energy Conversion Devices, Inc. of Rochester Hills, Mich. Preferably, in a hydrogen fuel cell driven HVAC and power system 20 such as depicted in FIG. 6, the amount of hydrogen storage capacity is 3,600 to 10,880 liters. Using metal hydride tanks having a 900 liter hydrogen storage capacity, this volume of hydrogen can be achieved using 4 to 12 metal hydride tanks respectively. The metal hydride tanks are cylinders of approximately 3.5-inches diameter by 17-inches long, which defines an inner volume of approximately 1.06 liters. Thus, each tank is capable of storing approximately 850 times its volume in hydrogen. Metal hydrides are comprised of chemical compounds that store hydrogen in solid form and reversibly release hydrogen upon heating. Storage of hydrogen in metal hydride tanks is inherently safer than compressed hydrogen, which requires large tanks and high storage pressures and is more economical than liquid hydrogen, which requires cryogenic storage and a large energy loss as a result of liquefying the hydrogen.

The modular hydrogen fuel cell driven HVAC and power system 20 of the present invention embodies the needs of the operator and owner to fully comply with all governmental requirements with fast implementation as well as forward and backward compatibility on equipment. The modular hydrogen fuel cell driven HVAC and power system 20 mounted on chassis 142 is mounted to the exterior of the cab 146 on a permanently mounted base plate 144. The base plate 144 is an interface structure between the cab 146 and the HVAC and power system 20. The base plate 144 has ventilation penetrations 148 and 150 to the cab 146, and AC and-DC power interfaces (not shown) to the existing power distribution. The modular HVAC and power system 20 attaches to the isolation mounts of the base plate 144, seals itself with built in seals and gaskets and makes electrical connections with built in quick connectors.

The modular HVAC and power system 20 will be equipped with a unit design and serial number tracking system to enable system tracking and flexible management for owners within fleets. Simple forward and backward compatibility of units allows owners the option to remove units from vehicles for factory refurbishment at vehicle overhaul intervals, allows owners to store spare units at fleet repair facilities, allows owners to remove units from out-dated sold equipment for reinstallation on new or existing equipment. The owner will also have flexibility for fleet rotation from long haul to short haul equipped vehicles. The base plate 144 remains on the truck when the modular HVAC and power system 20 is removed. An optional base plate cover can be installed to keep the base plate clean and prevent any air infiltration to the cab. A significant benefit to the owner is no down time due to a faulty unit as the modular HVAC/power unit 20 has no effect on the original operation of the truck.

The modular HVAC/power unit 20 provides cab temperature comfort and auxiliary power during but not limited to times when the engine is off. The vehicle operator will have on-off control of AC power, DC power, and fan and temperature selection with an in-cab wired or wireless control panel 112. The operator control panel 112 displays cab interior temperature with optional manual selection of inside humidity, outside temperature, and outside humidity displays. A significant advantage of the present invention is the ability to generate hydrogen for storage while the engine is on or the vehicle is moving. DC electricity for hydrogen generation is provided primarily by, but not limited to, a transmission mounted DC generator 76 in the same manner as conventional power take-off (PTO) equipment is mounted. A dedicated intelligent networked controller varies the load placed on the vehicle by the DC generator for the generation of hydrogen based on storage need compared with vehicle operation for maximum use of wasted kinetic energy and minimum use of engine energy for optimum storage. DC electricity from the generator 76 is routed to a proton exchange membrane (PEM) electrolyzer 80 that converts distilled water into hydrogen and oxygen in separate chambers. The hydrogen is dried and stored at 250 psi using the natural ion pumping capacity of the PEM cells 84. The hydrogen fuel cell driven HVAC and power system 20 intelligently uses a combination of high efficiency power production through captured wasted kinetic energy and peak engine performance to refuel itself with stored hydrogen.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A hydrogen fuel cell driven heating ventilation air conditioning (HVAC) and power system, comprising:
    a proton exchange membrane (PEM) electrolyzer configured to convert water into hydrogen gas and oxygen;
    at least one hydrogen storage tank configured to store the hydrogen gas generated by the PEM electrolyzer;
    a PEM fuel cell configured to combine hydrogen from the at least one hydrogen storage tank with oxygen in the air; and
    a multistage dryer and an automatic drain valve configured to remove moisture from the hydrogen gas to 10 parts per million (ppm) $H_2O$ or less before the hydrogen gas enters the at least one hydrogen storage tank.

2. The hydrogen fuel cell driven HVAC and power system of claim 1, further comprising:
    an electrolyzer coolant loop configured to control a temperature of the PEM electrolyzer;
    a fuel cell coolant loop configured to control a temperature of the PEM fuel cell; and
    a multi coil heat exchanger configured to recapture heat from the electrolyzer and the fuel cell coolant loops for use in a heat pump.

3. The hydrogen fuel cell driven HVAC and power system of claim 2, wherein a source of DC voltage configured to power the electrolyzer is selected from the group consisting of a transmission mounted DC generator, a solar panel, a wind turbine, and an external power source.

4. The hydrogen fuel cell driven HVAC and power system of claim 3, wherein
    the PEM electrolyzer comprises four PEM cells, and
    each of the PEM cells comprises a 6-cell polymer electrolytic membrane electrolysis unit rated for 14.5 Volts direct current (VDC) at 75 amps and produces at least 6.3 liters/minute of hydrogen gas.

5. The hydrogen fuel cell driven HVAC and power system of claim 4, wherein loading of the PEM electrolyzer is controlled by enabling or disabling the PEM cells in conjunction with varying output of a source of DC voltage.

6. The hydrogen fuel cell driven HVAC and power system of claim 1, wherein the at least one hydrogen storage tank comprises metal hydride storage canisters configured to store at least 900 liters of hydrogen per canister.

7. The hydrogen fuel cell driven HVAC and power system of claim 1, wherein
    the PEM fuel cell comprises a liquid-cooled hydrogen fueled proton exchange membrane fuel cell stack, and the fuel cell is configured to generate at least 4.5 kilowatts (kW) of power at 15.5 Volts direct current (VDC) and 300 amps.

8. The hydrogen fuel cell driven HVAC and power system of claim 1, further comprising a voltage converter, wherein the voltage converter comprises:
   a DC/DC power converter configured to covert the electrical output of the PEM fuel cell to a constant 14.6 Volts direct current (VDC) at 200 amps maximum; and
   a DC/AC inverter configured to supply AC power.

9. The hydrogen fuel cell driven HVAC and power system of claim 1, further comprising a controller, wherein the controller comprises:
   a fuel cell controller;
   an electrolyzer controller; and
   a heat pump controller.

10. The hydrogen fuel cell driven HVAC and power system of claim 1, further comprising an air supply to the PEM fuel cell, wherein the air supply comprises an air membrane humidifier configured to humidify incoming air to the PEM fuel cell.

11. The hydrogen fuel cell driven HVAC and power system of claim 1, wherein
   the PEM fuel cell comprises a hydrogen fuel supply and a hydrogen pressure control valve configured to control output pressure of hydrogen fuel from the PEM fuel cell, and
   the hydrogen pressure control valve is configured to control the output pressure from 0-17 pounds per square inch (psi).

12. The hydrogen fuel cell driven HVAC and power system of claim 1, further comprising an air supply to the PEM fuel cell, wherein the air supply comprises a pulse width modulated (PWM) variable speed blower, the blower configured to control air pressure from 0-14.5 pounds per square inch (psi) and to control air flow from 0-200 liters/minute.

13. The hydrogen fuel cell driven HVAC and power system of claim 1, wherein
   the PEM fuel cell comprises a hydrogen recirculation loop, and
   the hydrogen recirculation loop comprises a hydrogen recirculation pump and a solenoid operated purge valve configured to purge stale gas and excess moisture from the hydrogen recirculation loop.

14. The hydrogen fuel cell driven HVAC and power system of claim 1, further comprising a heat pump comprising:
   a refrigerant cooling loop comprising refrigerant;
   a heat exchanger;
   a reversing valve in the refrigerant cooling loop; and
   a heat pump controller configured to cycle a reversing valve to switch the heat pump from a cooling mode to a heating mode as called for by a controller.

15. An apparatus, comprising:
   a fuel cell coolant loop, the fuel cell coolant loop comprising
      a pulse width modulated (PWM) variable speed coolant circulating pump configured to circulate cooling water between a PEM fuel cell and a multi-coil heat exchanger; and
      a cooling loop thermostatic control valve in the fuel cell cooling loop configured to enable bypassing of the multi coil heat exchanger until an operating temperature of the PEM fuel cell reaches 141° F.

16. The apparatus of claim 15, further comprising:
   a multistage dryer and an automatic drain valve configured to remove moisture from hydrogen gas to 10 parts per million (ppm) $H_2O$ or less before the hydrogen gas enters at least one hydrogen storage tank.

17. An apparatus, comprising:
   a fuel cell coolant loop comprising a hydrogen storage cooling valve, wherein
   the hydrogen storage cooling valve is configured to enable bypassing of a cooling loop thermostatic control valve and a PEM fuel cell to enable coolant to cool at least one hydrogen storage tank.

18. The apparatus of claim 17, further comprising:
   a multistage dryer and an automatic drain valve configured to remove moisture from hydrogen gas to 10 parts per million (ppm) $H_2O$ or less before the hydrogen gas enters the at least one hydrogen storage tank.

19. An apparatus, comprising:
   an electrolyzer coolant loop comprising a pulse width modulated (PWM) direct current (DC) volt pump and a multi coil heat exchanger, wherein
   the electrolyzer coolant loop is configured to circulate distilled water through PEM cells to maintain a temperature of 130° F. in the PEM cells.

20. The apparatus of claim 19, further comprising:
   a multistage dryer and an automatic drain valve configured to remove moisture from hydrogen gas to 10 parts per million (ppm) $H_2O$ or less before the hydrogen gas enters at least one hydrogen storage tank.

* * * * *